United States Patent
Fisher et al.

(10) Patent No.: US 6,680,036 B1
(45) Date of Patent: Jan. 20, 2004

(54) THREE-WAY CATALYST

(75) Inventors: Janet Mary Fisher, Reading (GB); Timothy Ian Hyde, Reading (GB); Torquil George Spenser Landen, Henley on Thames (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/600,036

(22) PCT Filed: Jan. 6, 1999

(86) PCT No.: PCT/GB99/00026

§ 371 (c)(1), (2), (4) Date: Aug. 24, 2000

(87) PCT Pub. No.: WO99/34904

PCT Pub. Date: Jul. 15, 1999

(30) Foreign Application Priority Data

Jan. 9, 1998 (GB) ................................................ 9800325

(51) Int. Cl.$^7$ .............................. B01J 8/00; B01J 23/32; B01J 23/64; B01J 23/00

(52) U.S. Cl. .................... 423/213.2; 502/324; 502/325; 502/326; 502/349

(58) Field of Search ........................ 423/213.2; 502/324, 502/325, 349, 326

(56) References Cited

U.S. PATENT DOCUMENTS

| | | | |
|---|---|---|---|
| 3,983,072 A | 9/1976 | Stephens | 252/460 |
| 4,299,734 A | 11/1981 | Fujitani et al. | 252/462 |
| 4,714,694 A * | 12/1987 | Wan et al. | 502/304 |
| 4,927,799 A | 5/1990 | Matsumoto et al. | 502/303 |
| 5,053,378 A | 10/1991 | Blanchard et al. | 502/304 |
| 5,283,041 A * | 2/1994 | Nguyen et al. | 423/240 |
| 5,976,476 A * | 11/1999 | Blanchard et al. | 423/213.2 |
| 6,143,261 A * | 11/2000 | Lissy et al. | 423/213.5 |
| 6,214,303 B1 * | 4/2001 | Hoke et al. | 423/210 |

FOREIGN PATENT DOCUMENTS

| | | |
|---|---|---|
| GB | 1 401 838 | 7/1975 |
| GB | 2 048 101 | 12/1980 |
| WO | WO 96/20787 | 7/1996 |

OTHER PUBLICATIONS

UK Search Report for priority UK Application GB 9800325.4, dated May 8, 1998.

International Search Report for PCT Application No. PCT/GB99/00026.

* cited by examiner

*Primary Examiner*—Stanley S. Silverman
*Assistant Examiner*—Jonas N. Stricklalnd
(74) *Attorney, Agent, or Firm*—RatnerPrestia

(57) ABSTRACT

New three-way catalysts for vehicles contain, as an oxygen storage component, mixed oxide MnZr. These components are less expensive than state-of-the-art ceria/zirconia, and generally offer improved capacity even after exposure to high temperatures.

17 Claims, 3 Drawing Sheets

OSC PROPERTIES OF AGED Mn OXIDES

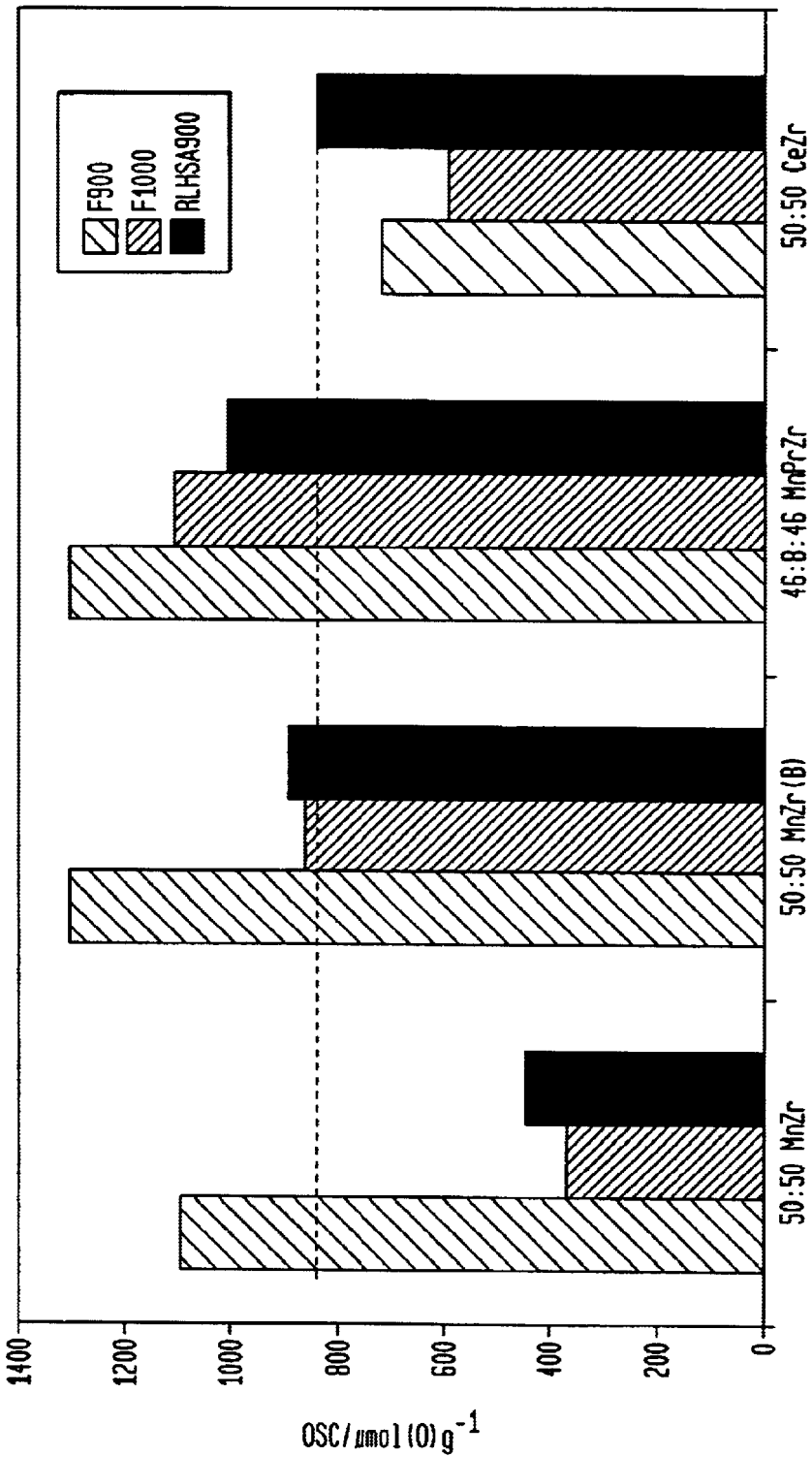

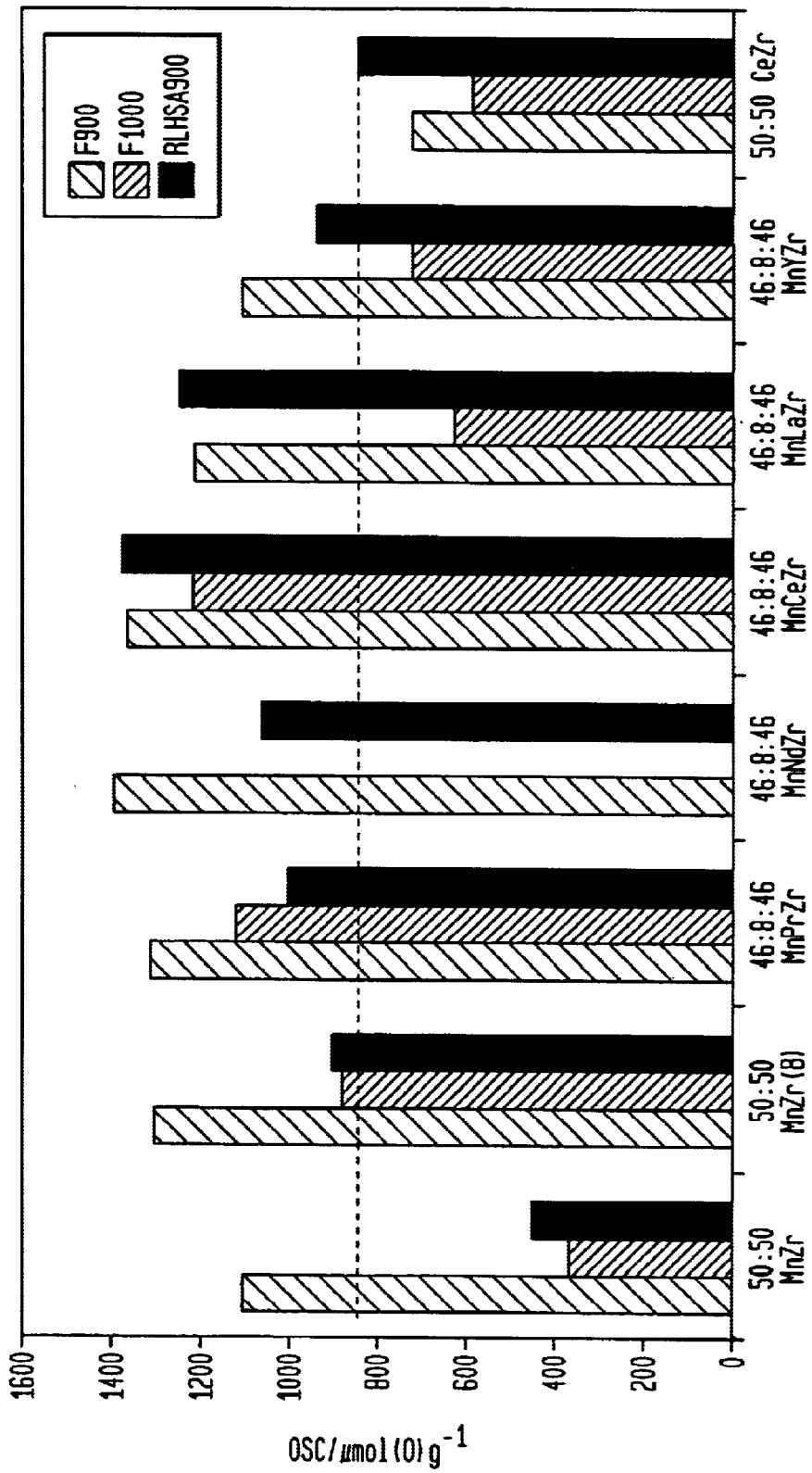

THREE-WAY CATALYST

Figure 1:
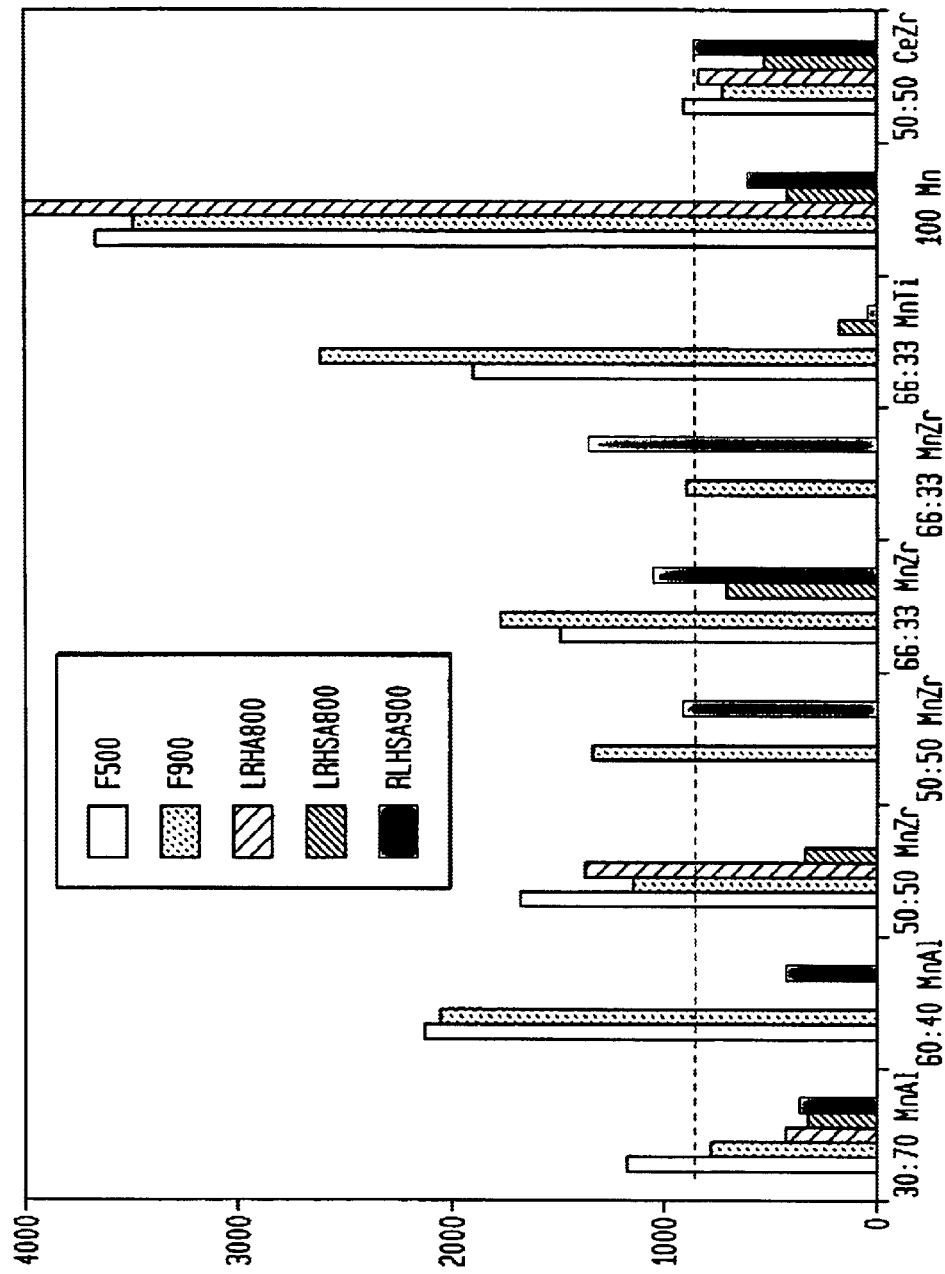

This application is the U.S. national-phase application of PCT International Application No. PCT/GB99/00026

The present invention concerns improvements in catalytic materials, and more especially it concerns improvements in catalyst components which are capable of storing oxygen.

The use of automobile exhaust gas catalysts has contributed to a significant improvement in air quality. The most commonly used catalyst is the "three-way catalyst" (TWC) which has three main duties, duties, namely the oxidation of CO, the oxidation of unburnt hydrocarbons (HC's) and the reduction of NOx to $N_2$. Such catalysts require careful engine management techniques to ensure that the engine operates at or close to stoichiometric conditions (air/fuel ratio, $\lambda=1$). For technical reasons, however, it is necessary for engines to operate on either side of $\lambda=1$ at various stages during an operating cycle. When the engine is running rich, for example during acceleration, the overall exhaust gas composition is reducing in nature, and it is more difficult to carry out oxidation reactions on the catalyst surface. For this reason, TWC's have been developed to incorporate a component which stores oxygen during leaner periods of the operating cycle, and releases oxygen during richer periods of the operating cycle, thus extending the effective operating envelope. This component is believed to be ceria-based in the vast majority of current commercial TWC's. Ceria, however, especially when doped with precious metal catalysts such as Pd, shows a great tendency to lose surface area when exposed to high temperatures, eg 800° C. or above, and the overall performance of the catalyst is degraded Because of this, TWC's are being proposed and introduced in some demanding markets which use, instead of ceria as the oxygen storage component, ceria-zirconia mixed oxides, which are very much more stable to loss of surface area than ceria alone. Ceria itself is a rare earth metal with restricted suppliers and ceria-zirconia is a relatively expensive material when available commercially, and it would be desirable to find a material having at least as good oxygen storage performance as ceria-zirconia, but utilising less expensive materials.

Herein, reference will be made to various mixed oxides. It is now accepted in the art that for ceria-zirconia, the best oxygen storage performance is exhibited by "true" mixed oxides, that is single phase mixed oxides, compared to mixed oxides which contain two or more phases.

The prior published U.S. Pat. No. 4,299,734 for instance describes the use of a stable catalyst composition which comprises platinum or palladium and a porous support consisting of zirconia and at least one oxide selected from cerium oxide, manageschool oxide and iron oxide. However, the oxides other than zirconium are only present in very small amounts ie 1–80 g/liter of zirconium oxide and hence have no oxygen storage capacity.

Similarly, WO-A-96 20787 discloses a catalyst for treating a gas stream containing (halogenated) organic compounds carbon monoxide and mixtures thereof, the catalyst comprising at least one platinum group metal, zirconium oxide and at least one oxide selected from manganese oxide, cerium oxide and cobalt oxide, the catalyst being substantially free of vanadium. However, this document also contains an excess of zirconium oxide in relation to the other oxides and the catalyst is used for treating gas streams rich in oxidising gases —unlike the reducing gases which are emitted by exhaust systems of automotive engines. Again, there is no mention of the catalyst composition having any oxygen storage capacity.

The present invention is based upon the discovery that certain mixed oxides exhibit surprisingly good oxygen storage capacity according to standard tests and especially when exposed to high temperature ageing. A large number of single oxides have been suggested or actually included in exhaust gas catalyst formulations in the past, but we believe that this was not for oxygen storage, but was probably for "promotion" of the catalytic metal, or possibly for the suppression of $H_2S$.

The present invention provides novel TWC's comprising an oxygen storage component, comprising a manganese/zirconium mixed oxide, characterised in that the molar ratio of the mixed oxide is in the range from 50:50 to 70:30, manganese:zirconium.

In all cases, the oxides may contain small amounts of other elements providing that these do not significantly adversely affect the TWC performance of the resulting catalysts. Additionally, optimisation of the oxygen storage components utilised in the present invention may result in doping of the oxides to provide further stability or performance enhancement If one or more doping agents are desired, it would be appropriate to consider additions of 5 to 30 mol % based on $ZrO_2$ content, and such doping agents may include the oxides of rare earths such as neodymium, cerium, praseodymium and lanthanum, as well as yttrium, niobium, titanium and vanadium.

It is, of course, common for TWC's to contain other components, and the invention does not intend to exclude these.

The TWC contains one or more platinum group metals ("PGMs") as catalytic components; particularly suitable for use in the present invention are one or more of platinum, palladium and rhodium.

It is well established that surface area plays an important part in catalytic processes, and generally there is a drive to maximise surface area of catalytic supports in order to maximise the dispersion of the active catalytic sites. Indeed, in the existing ceria-supported TWC's, the loss of surface area upon calcining at temperatures of 800–900° C., representing high temperature excursions during use, is clearly associated with loss of catalytic activity. Although the ceria-zirconia stabilised mixed oxides which are being developed appear to store and release oxygen in the bulk oxide structure, it is also clear that surface area remains an important criterion for a high activity catalyst. To our considerable surprise, we have discovered that certain of the materials relating to this invention do not follow expectations on the relationship between surface area and activity. In particular, manganese dioxide and those mixed oxides incorporating manganese according to the invention show high oxygen storage capability at remarkably low surface areas, for example areas of around 5 $m^2/g$. If such materials are not critically dependent upon the dispersion of precious metal and do not lose very much area at high temperatures, this advantageously permits preparation routes that are not restricted by the requirement to produce oxides of areas of 50–100 $m^2$ g. In general, however, increasing surface area may be expected to lead to increasing catalytic activity.

Another surprising conclusion arising from the experimental work from which this invention arose is that, contrary to the experience with ceria-zirconia, some of the best oxygen storage characteristics are not necessarily associated with true single phase mixed oxides but rather with mixed oxide phases most suitably in the form of an intimate physical mixture of Mn and Zr oxide. Again, this permits preparation and processing conditions which are not restricted by the requirement to achieve true mixed oxides.

Suitable mixed oxides for the present invention may be prepared by conventional means, namely co-precipitation. For example, solutions of soluble salts of the metals may be mixed in the appropriate concentrations and amounts to yield the desired end product, then caused to precipitate concurrently, for example by adding a base such as ammonium hydroxide. Alternatively, other preparative routes utilising generally-known technology, such as sol/gel or gel precipitation, have been found suitable. The precipitated oxides as slurries may be filtered, washed to remove residual ions, dried, then fired or calcined at elevated temperatures (>450° C.) in air.

To assess the mixed oxides of the present invention for oxygen storage performance, low levels of precious metal (<4.5 wt %), such as platinum, palladium or rhodium are added to the mixed oxide by conventional means, namely, incipient wetness impregnation. This ensures a good dispersion of the precious metal on the support. It is well known that to achieve good oxygen storage performance a good interaction of the precious metal with the support is necessary. The precious metal impregnated mixed oxides are generally further thermally treated prior to activity testing. This can include a calcination in air at elevated temperatures (>500° C.) together with a treatment designed to simulate the changing exhaust gas mixture typically found by catalysts in vehicle exhaust systems. It has been found that subjecting the precious metal impregnated mixed oxide to a calcination at 900° C. in air is a convenient means of pre-treatment, to distinguish between good and bad materials.

We have found that, desirably, the Mn components of the mixed oxides of the present invention are present m higher oxidation states than is common to some commonly known oxide structures containing both Mn and Al or Ti, such as spinel and perovskite phases. Thus it is desirable that at least some of the Mn be present in an oxidation state above 2+. Where necessary, this can be achieved by resorting to oxide mole ratios and preparation techniques that avoid these mixed oxide phases. In some cases, it is desirable to arrange the component oxides so that they do not form a true single phase, but remain an intimate mixture of oxide phases.

The oxide catalyst components of the present invention have been tested for their ability to store and release oxygen according to a test developed in-house. After impregnating the sample oxide with a solution of a Pd salt, for example Pd nitrate, in sufficient quantity to deposit 2% by weight Pd on the oxide, the samples are then calcined at 500° C. in air to fix the Pd onto the oxide, and then further calcined at 900° C. in air to mimic catalyst ageing, and samples are then charged into a micro-reactor. The samples are oxidised by passing a diluted oxygen in helium gas mix over the samples at the chosen temperature, eg 500° C., then the oxygen flow is terminated and diluted carbon monoxide (CO) in helium gas mix is passed over the sample. The time required to detect CO breakrough is measured and is used to give a reproducible assessment of Oxygen Storage Capacity ("OSC"). OSC is generally quoted in units of micromole of oxygen per gramme of sample ("$\mu$mol(O)g$^{-1}$").

The new oxygen storage components may be used in any catalyst design, including single layer and layered catalysts and distributed particle catalysts, using conventional catalyst preparative methods.

In addition to the new oxygen storage components being intrinsically less expensive than ceria/zirconia, and generally offering better performance, certain of the materials, especially those comprising neodymium as a dopant, appear to exhibit better tolerance to sulphur from fuel than ceria/zirconia at levels of 10 ppm $SO_2$ in synthetic exhaust gas tests.

Samples of various mixed oxides including those of the present invention, were prepared, loaded with 2% Pd and tested in the OSC apparatus. Such samples were tested after calcining for 2 hours at 500° C. in air ("F500") and at 2 hours at 900° C. in air ("F900"). Additionally ageing tests were carried out on most of the samples according to an in-house test protocol; thus, LRHA800 represents OSC for a lean/rich hydrothermal ageing peaking at 800° C., LRHSA represents a similar test but using a test gas containing 10 pp $SO_2$, and peaking at 800° C. or RLHSA 900 represents a test using a rich/lean ageing in the presence of sulphur. The OSC values in $\mu$molO/g$^{-1}$ are plotted on FIG. 1. A variety of mixed oxides were tested; the figures refer to molar ratios of the oxides. Two samples of 50:50MnZr and 66:33MnZr were prepared and tested; results for both are shown. The 50:50Ce:Zr results are from a current state of the art composition; it can be seen that the 50:50MnZr and 66:33MnZr generally show improved performance when exposed to ageing conditions whilst showing remarkable OSC values under less testing conditions, demonstrates a significant fall-off of activity when exposed to 10 ppm sulphur, which is more representative of conditions using commercial fuels.

FIG. 2 represents the results of similar tests. Two different 50:50MnZr oxides are shown, the first prepared by co-precipitation using $NH_3$, and the second prepared using NaOH. It appears that the stronger base causes a structural change which is beneficial to OSC at all temperatures tested. The incorporation of a dopant, in this case Pr, yields improved results at higher temperatures and in the presence of sulphur.

FIG. 3 represents the results of similar tests, illustrating a number of different doped formulations.

The results of these tests are extremely encouraging at this stage of development, and it is to be expected that optimisation will lead to further improvements in performance.

What is claimed is:

1. A vehicle comprising a substantially stoichiometrically operated engine comprising an exhaust system wherein said exhaust system comprises a three-way catalyst comprising an oxygen storage component comprising a manganese/zirconium mixed oxide obtained by co-precipitation, sol/gel or gel precipitation, wherein the molar ratio of said mixed oxide is in the range of 50:50 to 70:30 manganese:zirconium and said mixed oxide has a surface area below 10 m$^2$/g.

2. A catalyst according to claim 1, wherein said mixed oxide contains manganese in an oxidation state higher than 2.

3. A catalyst according to claim 1 or 2, wherein said oxygen storage component further comprises at least one dopant in a total amount of 5 to 30 mol % based on $ZrO_2$ content.

4. A catalyst according to claim 3, wherein said dopant is selected from a group consisting of ceria, and the oxides of neodymium, praseodymium, lanthanum, yttrium, niobium, titanium and vanadium.

5. A catalyst according to claim 3, wherein said at least one dopant consists of ceria.

6. A catalyst according to claim 1 or 2, further comprising a catalytically-active metal selected from at least one of platinum and palladium.

7. A catalyst according to claim 6, wherein said catalytically-active metal further comprises rhodium.

8. A vehicle according to claim 1, wherein said mixed oxide is in the form of an intimate physical mixture of manganese oxide and zirconium oxide.

9. A vehicle comprising a substantially stoichiometrically operated engine comprising an exhaust system wherein said exhaust system comprises a three-way catalyst comprising an oxygen storage component consisting essentially of a manganese/zirconium mixed oxide obtained by co-precipitation, sol/gel or gel precipitation, wherein the molar ratio of said mixed oxide is in the range of 50:50 to 70:30 manganese:zirconium and said mixed oxide has a surface area below 10 $m^2/g$.

10. A vehicle according to claim 9, wherein said mixed oxide is in the form of an intimate physical mixture of manganese oxide and zirconium oxide.

11. The vehicle according to claim 1 or 9, wherein the surface area of said mixed oxide is below 5 $m^2/g$.

12. An exhaust system comprising a three-way catalyst comprising an oxygen storage component consisting essentially of a manganese/zirconium mixed oxide obtained by co-precipitation, sol/gel or gel precipitation, wherein the molar ratio of said mixed oxide is in the range of 50:50 to 70:30 manganese:zirconium and said mixed oxide has a surface area below 10 $m^2/g$.

13. An exhaust system according to claim 12, wherein said mixed oxide is in the form of an intimate physical mixture of manganese oxide and zirconium oxide.

14. The exhaust system according to claim 12, wherein the surface area of said mixed oxide is below 5 $m^2/g$.

15. A substantially stoichiometrically operated engine comprising an exhaust system comprising a three-way catalyst comprising an oxygen storage component consisting essentially of a manganese/zirconium mixed oxide obtained by co-precipitation, sol/gel or gel precipitation, wherein the molar ratio of said mixed oxide is in the range of 50:50 to 70:30 manganese:zirconium and said mixed oxide has a surface area below 10 $m^2/g$.

16. An engine according to claim 15, wherein said mixed oxide is in the form of an intimate physical mixture of manganese oxide and zirconium oxide.

17. The engine according to claim 15, wherein the surface area of said mixed oxide is below 5 $m^2/g$.

* * * * *